(12) United States Patent
Schindel

(10) Patent No.: US 7,980,599 B2
(45) Date of Patent: Jul. 19, 2011

(54) IDENTIFICATION SYSTEM FOR PNEUMATIC COUPLERS

(75) Inventor: Richard T. Schindel, Anamosa, IA (US)

(73) Assignee: Weems Industries, Inc., Marion, IA (US)

( * ) Notice: Subject to any disclaimer, the term of this patent is extended or adjusted under 35 U.S.C. 154(b) by 883 days.

(21) Appl. No.: 11/525,652

(22) Filed: Sep. 22, 2006

(65) Prior Publication Data

US 2007/0257484 A1 Nov. 8, 2007

Related U.S. Application Data

(60) Provisional application No. 60/798,083, filed on May 5, 2006.

(51) Int. Cl.
*F16L 37/00* (2006.01)
(52) U.S. Cl. ............... 285/316; 285/277; 285/93
(58) Field of Classification Search .......... 285/55, 285/277, 316, 93
See application file for complete search history.

(56) References Cited

U.S. PATENT DOCUMENTS

| | | | | |
|---|---|---|---|---|
| 3,170,667 A * | 2/1965 | Szohatzky | ............... | 285/914 |
| 3,592,231 A * | 7/1971 | Lamb | ............... | 137/614.04 |
| 3,770,009 A * | 11/1973 | Miller | ............... | 137/543.19 |
| 3,873,028 A * | 3/1975 | Miller | ............... | 239/413 |
| 3,873,062 A * | 3/1975 | Johnson et al. | ............... | 251/149.6 |
| 3,970,103 A * | 7/1976 | McKee | ............... | 137/357 |
| 4,114,853 A * | 9/1978 | Medvick | ............... | 285/316 |
| 4,634,151 A * | 1/1987 | Holt | ............... | 285/38 |
| 4,696,326 A * | 9/1987 | Sturgis | ............... | 137/614.04 |
| 4,923,806 A * | 5/1990 | Klodowski | ............... | 436/39 |
| 5,060,689 A * | 10/1991 | Csaszar et al. | ............... | 137/515 |
| 5,116,088 A * | 5/1992 | Bird | ............... | 285/319 |
| 5,158,327 A * | 10/1992 | Rowe | ............... | 285/38 |
| 5,167,140 A * | 12/1992 | Cooper et al. | ............... | 73/40.7 |
| 5,577,775 A * | 11/1996 | Pearson et al. | ............... | 285/24 |
| 5,655,794 A * | 8/1997 | Sell | ............... | 285/25 |
| 5,662,359 A | 9/1997 | Kargula | | |
| 5,678,542 A * | 10/1997 | Maffatone | ............... | 128/205.24 |
| 5,971,019 A * | 10/1999 | Imai | ............... | 285/330 |
| 6,032,537 A * | 3/2000 | McLaren | ............... | 73/756 |
| 6,092,390 A * | 7/2000 | Griffith, Jr. | ............... | 62/468 |
| 6,328,566 B1 * | 12/2001 | Feine | ............... | 433/119 |
| 6,612,619 B2 | 9/2003 | Wieder | | |
| 7,159,491 B1 * | 1/2007 | Chaconas et al. | ............... | 81/58.1 |
| 2005/0001425 A1 | 1/2005 | de Cler et al. | | |

OTHER PUBLICATIONS

McMaster-Cann catalog, Color-Coded Brass Hose Couplings, p. 266, http://www.mcmaster.com/.

* cited by examiner

*Primary Examiner* — David E Bochna
(74) *Attorney, Agent, or Firm* — Allan L. Harms; Shuttleworth & Ingersoll, PLC

(57) ABSTRACT

A coupler and plug system for air line uses which identifies properly mating components by the colors of the components. The coupler of the system includes a sleeve which is made in a chosen color. The plug of the system is made in the same color as the sleeve of the coupler. The plug and coupler sleeve may be anodized aluminum dyed in the same color. By choosing a plug which is of a matching color to the sleeve of a coupler, the user will choose a plug which properly mates with the coupler.

10 Claims, 3 Drawing Sheets

IDENTIFICATION SYSTEM FOR PNEUMATIC COUPLERS

CROSS-REFERENCE TO RELATED APPLICATIONS

This application claims priority from co-pending provisional patent application entitled "Identification System for Pneumatic Couplers," Ser. No. 60/798,083 filed May 5, 2006. The disclosure of provisional patent application Ser. No. 60/798,083 is hereby incorporated in its entirety.

BACKGROUND OF THE INVENTION

Air line coupler elements for pneumatically operated equipment include couplers that matingly receive plugs. Optimally, the plugs are received in the couplers by mating in a substantially hermetically sealed condition. Plugs are frequently mounted to pneumatic tools such as wrenches, while couplers terminate compressed air hose or tubing.

Plugs and couplers are made in different configurations, that is, plugs and couplers made for industrial uses differ from those made for automotive uses and both types differ from other couplers and plugs made by certain manufacturers, such as ARO™ couplers and plugs from Ingersoll-Rand Company Limited and LINCOLN™ couplers and plugs from Lincoln Industrial Corp. Sometimes plugs and couplers are identified as type A, B, C or D in order to categorize mating components. For example, type A plugs will properly mate with type A couplers but not with types B, C or D couplers. However the type designation is not marked on individual conventional components. In the field, users encounter plugs and couplers from various sources and must use trial and error to determine when a properly mating set of plug and coupler is available. This trial and error results in much wasted time and if unsuccessful, results in use of incompatible plugs and couplers that mate incompletely and therefore leak. A method for a user to quickly visually sort plugs and couplers into properly mating pairs would prevent much wasted effort in the use of pneumatically operated equipment.

BRIEF SUMMARY OF THE INVENTION

This invention provides an identification system that allows easy visual determination of a properly mating set of plug and coupler for air line applications. The system provides identifiers on each set of plug and coupler which identify the coupling components as properly mating components, that is, a plug manufactured for the automotive industry contains a marking which shows that it is to be used with a coupler manufactured for the automotive industry and not one manufactured for industrial uses or one carrying the ARO™ brand or the LINCOLN™ brand. Likewise, a coupler that will properly mate with an automotive industry plug carries the same identification as the automotive industry plug so that a user seeking a properly mating set of plug and coupler will choose parts that bear the same identifier.

Color coding to match properly mating plug and coupler sets may be used to differentiate a compressed air line permeated with lubricant particles from a compressed air line without such lubricants so that a pneumatic tool which should be lubricated is coupled to such a compressed air source and not to a source carrying no lubricant.

Likewise a device such as a paint gun should not be coupled to a lubricant-permeated compressed air line, so differentiating the source of compressed air by a color indicator will prevent coupling a paint gun to an inappropriate wet compressed air line which is terminated with a coupler of a different color than the plug mounted to the paint gun.

In one embodiment, the coupler member includes a sleeve that is constructed of aluminum that has been anodized in a particular color. A plug which will mate properly with the coupler member is also constructed of aluminum and is anodized in the same color as the sleeve of the coupler member. Other materials, such as plastics that are colored, may be used for plugs and coupler sleeves to distinguish between the styles of air couplings common in North America. By observing the plugs and couplers available, the user can easily visually determine that a properly mating set of plug and coupler member are available when they are of the same color. Obviously, incompatible plug and coupler member sets would be identified by differing color anodization. For instance, automotive pneumatic couplers and plugs may be consistently blue in color, while industrial pneumatic couplers and plugs may be another color such as red, and ARO™ couplers and plugs may be a third distinct color such as green. By observing the color marking of available couplers and plugs, a user will immediately know when a non-mating pair is in hand and should not be used to assemble a pneumatic system. If the user has a coupler with a blue sleeve, the user will choose a blue plug to mate with it.

It is therefore an object of the invention to provide an identification system so that plugs matable with a selected coupler will be easily selected. Other objects of the invention are to provide air line connectors which will create airtight couplings; to provide color marked couplings and plugs which are entirely metal; or mineral-filled plastic, and to provide couplers and plugs which have durable color markings; to provide plugs and couplers which are made from colored polymeric compounds.

These and other objects of the invention will become apparent from examination of the detailed description which follows.

DETAILED DESCRIPTION OF THE INVENTION

Figure 1:
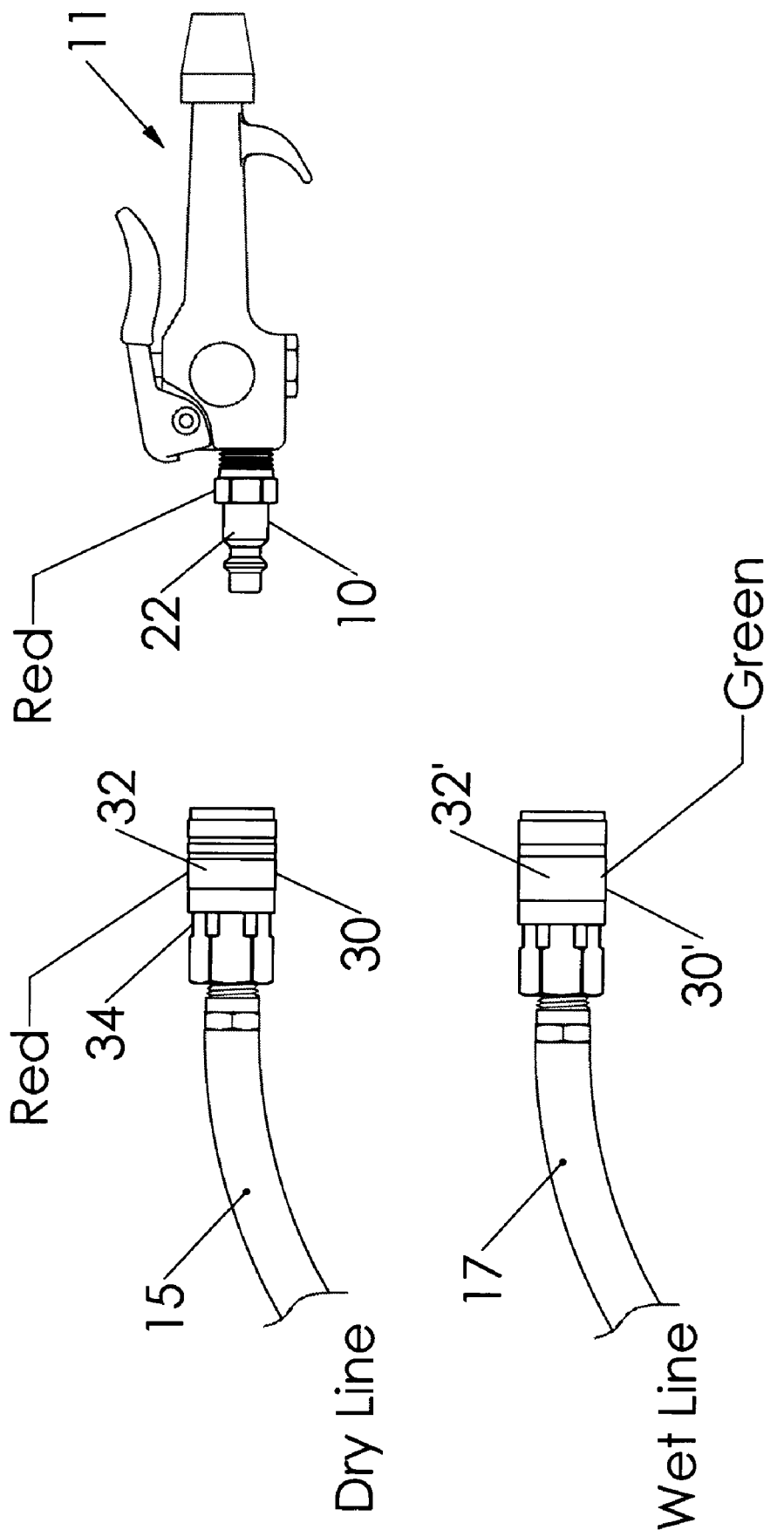
FIG. 1 is a front elevation of a blowgun fitted with a plug member which is properly matable with only one of two differing compressed air lines which are terminated by couplers having sleeves of contrasting colors.

FIG. 1 illustrates a blowgun 11 having a plug 10 mounted thereto to permit the blowgun 11 to be coupled to dry compressed air line 15. Plug 10 includes barrel 22 which is selectively receivable within a central longitudinal bore of coupler 30 which is joined to and terminates dry compressed air line 15. Coupler 30 includes sleeve 32 which surrounds body 34 of coupler 30 and is slideable therealong. Sleeve 32 comprises a physical marking which is observable by a user. In the preferred embodiment, sleeve 32 is constructed of aluminum and has been anodized and dyed red in the anodizing process. Red may be selected as the color to identify a coupler typically used for a dry compressed air application.

Plug 10 attached to blowgun 11 is also marked by a physical marking which is observable by a user. Preferably, plug 10 is constructed of anodized aluminum, having also been dyed red in the anodizing process. Plug 10 as seen in FIG. 1 is of the configuration for a plug used in a dry compressed air application and will properly mate with coupler 30 of dry compressed air line 15.

In contrast, a wet compressed air line hose 17, which would supply compressed air permeated with lubricant particles, is terminated with a coupler 30', which will not mate properly with plug 10 mounted to blowgun 11. Coupler 30 and coupler 30' are similar in shape but differ internally. To identify coupler 30' as terminating wet compressed air line 17, sleeve 32' of coupler 30' has been dyed green during anodization. The green marking on coupler 30' gives a visual indication to the user that coupler 30' is not compatible with red plug 10. Therefore, the user will appreciate that blowgun 11 is to be coupled to dry air line 15 and not to wet air line 17.

Figure 2:
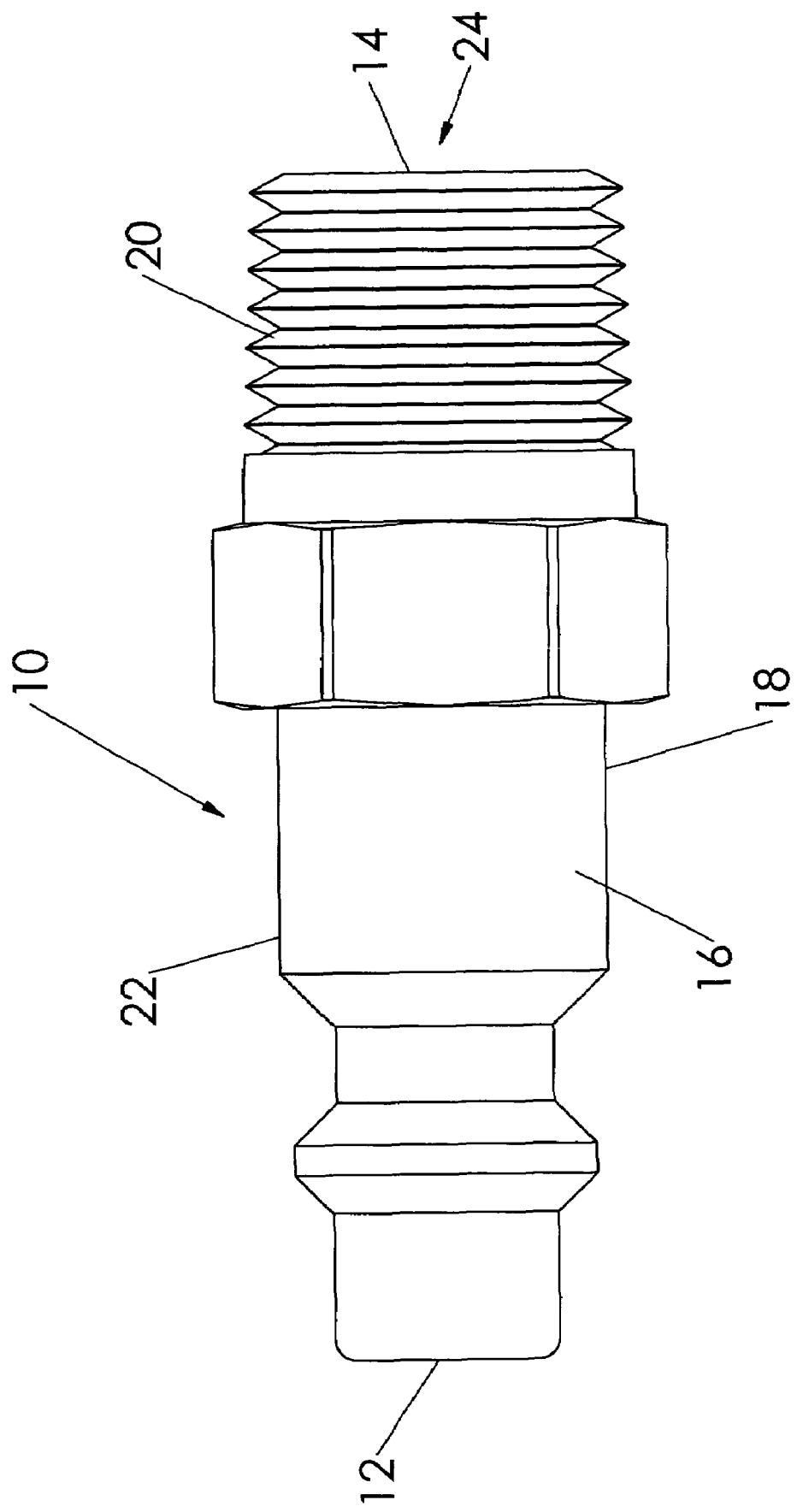
FIG. 2 is a front elevation of a plug element according to the present invention.

FIG. 2 discloses a plug 10 for a pneumatic system which for example purposes is of type D, the plug 10 having a first end 12 and an opposing second end 14. Plug 10 is constructed of aluminum and has been anodized to create a uniform aluminum oxide coating 16 on substantially the entire exterior surface 18 thereof, with color dye applied in the anodizing process to create a distinctive, selected color for plug 10. The selected color may be a primary color such as red, green or blue. The color of plug 10 is selected for the type of coupler that will properly receive barrel 22 thereof. Because the plug 10 has been anodized and dyed during anodization, substantially the entirety of exterior surface 18 thereof will be of the selected color.

Figure 3:
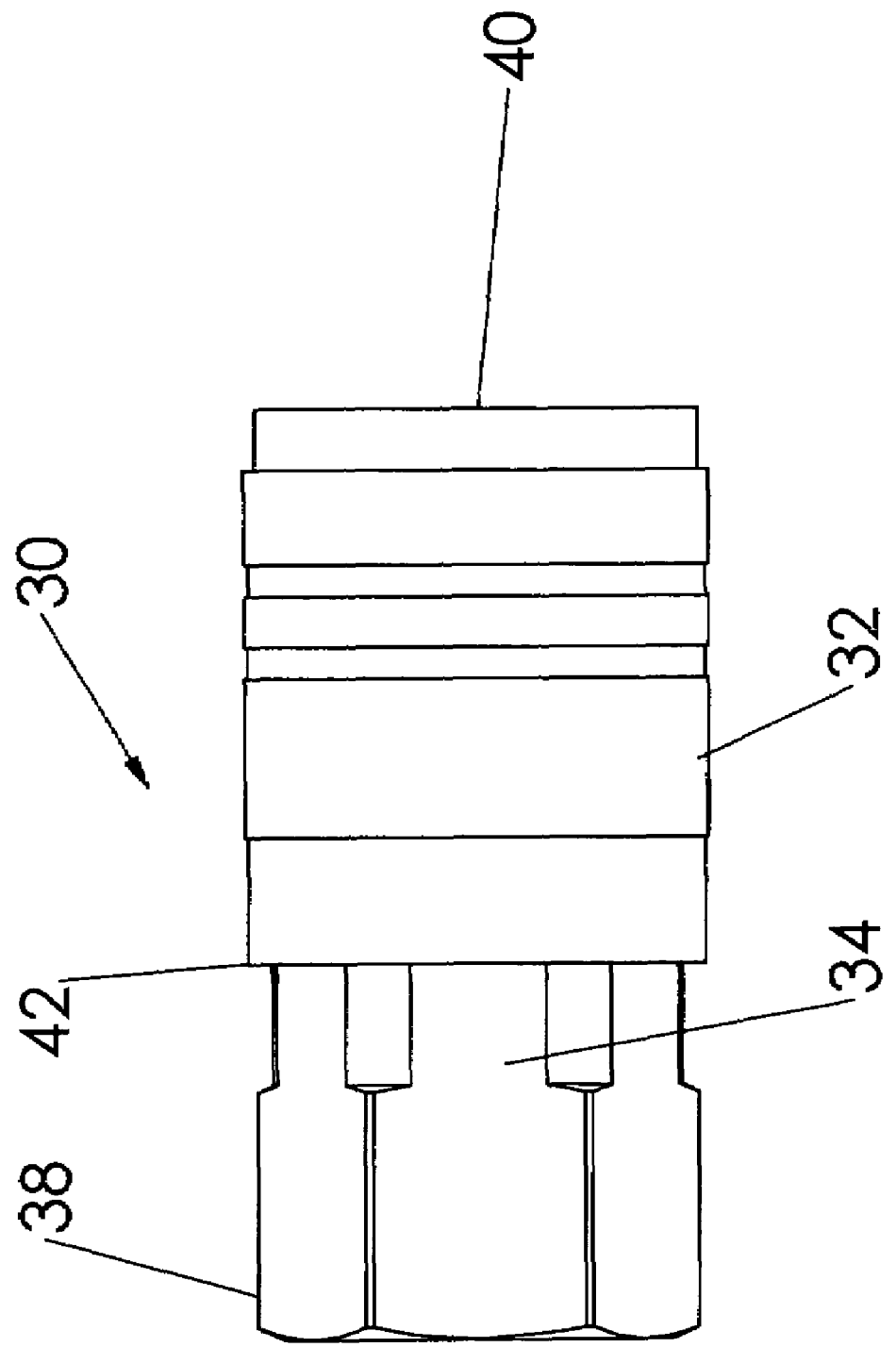
FIG. 3 is a front elevation of a coupler element according to the present invention.

First end 12 and barrel 22 of plug 10 may be received in a receiving element such as coupler 30 of FIG. 3 such that plug 10 may be selectively mated to coupler 30 to create a substantially airtight interconnection.

Second end 14 of plug 10 is provided with external threads 20 such that it can be mounted to a pneumatic tool (such as blowgun 11 of FIG. 1) having a threaded bore to receive second end 14 of plug 10.

It is to be understood that plug 10 of FIG. 2 is merely exemplary of a wide range of pneumatic plugs that may be used. For instance, second end 14 of plug 10 could be a female connector to receive the external threaded end of a pneumatic tool so equipped. In addition, plug 10 may be provided with a barrel region 22 that is of a different length or configuration than that shown in FIG. 2, in which event it would be of type A, B or C. However in the case of a plug 10 having a barrel 22 of a length or configuration which does not properly mate with coupler 30, a distinctive color is used to anodize exterior surface 18 of plug 10. The exemplary type D plug 10 illustrated in FIG. 2 is the type typically found in industrial or military applications.

For a plug 10 used in automotive applications and not of type D, barrel 22 will differ in shape and length and will not be properly received in the type D coupler 30 as seen in FIG. 3 but would mate properly with a coupler designed for use in automotive applications, that is, one structured to properly mate with a plug manufactured for automotive applications.

FIG. 3 illustrates a coupler 30 having a sleeve 32 slideable selectively along body 34 toward hex end 38 against a spring bias, though sleeve 32 will rest with first end 42 thereof spaced apart from hex end 38. When a barrel 22 of a plug 10 is to be inserted within bore 40 of body 34, sleeve 32 is urged along body 34 toward hex end 38 so that first end 12 and barrel 22 of plug 10 can be inserted into bore 40 and when first end 12 of plug 10 is seated, sleeve 32 is urged by the internal spring bias to slide away from hex end 38 along body 34 to its rest position whereupon barrel 22 of plug 10 is captured within bore 40 of coupler 30. In the preferred embodiment of FIG. 3, it is to be understood that sleeve 32 is constructed of aluminum that has been anodized and color dyed during the anodization process to a selected color, namely the same color as that of compatible plug 10. Because plug 10 is designed to be received by coupler 30, an airtight interconnection will be created between internal axial passageway 24 of plug 10 and bore 40 of coupler 30. Body 34 and hex end 38 may be constructed of steel or brass while sleeve 32 is constructed of aluminum so that it can be dyed a selected color in the anodization process. Alternatively, body 34 may also be constructed of aluminum which has been anodized in the selected color or a second color. Further hex end 38 may be also constructed of aluminum and anodized into a first color, a second color, or a third distinct color.

When the sleeve 32 is anodized in a selected color, a substantial proportion, preferable a majority, of the outer surface will be coated with aluminum oxide dyed in the selected color, and more preferably, substantially all of the outer surface of the sleeve 32 will be of the selected color.

As is easily understood, when a plug 10 of a selected color is used with a coupler 30 having a sleeve 32 of the same color as that of plug 10, the user will be confident that a proper coupling connection will be made between plug barrel 22 and bore 40 of coupler 30. If the colors of plug 10 and sleeve 32 differ, the user will be alerted that non-mating parts have been selected and proper interconnection will not be possible.

As an alternative to color anodizing for plug 10 and sleeve 32, paint markings, color labels, color coded tags, or other distinguishable markings may be placed on each of plug 10 and coupler sleeve 32 so that the user can quickly determine whether the markings of each element match and if so, that a proper interconnection is possible. If the color or other identifying marks on the plug 10 do not match that of the sleeve 32 of coupler 30, the user will immediately know that the parts are not fully compatible and a proper airtight interconnection will not be possible.

A further modification of the invention may have a first part of the sleeve 32 of the coupler 30 anodized and dyed with a first color and a second part thereof anodized in a second color. Similarly a first part of the plug 10 may be anodized and dyed the first color and a second part of the plug 10 anodized in the second color. Further, an alternative embodiment may have an array of two or more colors applied to both the sleeve 32 and the plug 10 so that the color array of the sleeve 32 matches the color array of the plug 10.

In the case in which a coupler 30 may be capable of properly mating with more than one configuration of plug 10, the sleeve 32 of the coupler 30 may be marked with more than one color, with each color matching the color of a type of plug 10 which will mate properly with coupler 30.

Plug 10 may alternatively be constructed of other rigid materials such as polymeric materials which are impregnated with fiber. A polymeric matrix from which plug 10 may be formed may include color pigment in a primary color or any distinctive color, uniformly dispersed through the matrix. The geometry of the resulting colored polymeric plug 10 is selected for the shape and dimensions of the desired plug 10; that is, a plug of ARO™ type, will be formed of a colored polymeric matrix which is of a different color from that used for LINCOLN™ coupler components, and also different from the color used for automotive uses, or the color used for industrial uses.

Likewise, coupler 30 may include a sleeve 32 constructed of a pigmented polymeric matrix of a fiber reinforced resin, or the coupler body 34 may be formed of pigmented fiber reinforced plastic materials, or both coupler body 34 and sleeve 32 may be formed from such polymeric material.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

The invention claimed is:

1. A system to facilitate selection of compatible pneumatic connection components comprising
a receiving coupler of a first type,
the receiving coupler of the first type properly matable only with a plug member of the first type,
at least an integral portion of the receiving coupler of a first color,
the plug member of the first type comprising a barrel receivable within a bore of the receiving coupler of the first type,
the plug member comprising an outer surface of the first color,
the receiving coupler comprises an anodized sleeve,
the sleeve anodized in the first color,
whereby a user may match the plug member to the receiving coupler based on visual examination of the colors thereof.

2. The system of claim 1 wherein
the plug is constructed of aluminum,
the plug anodized in the first color.

3. A system to facilitate selection of compatible pneumatic connection components comprising
a receiving coupler of a first type,
the receiving coupler of the first type properly matable only with a plug member of the first type,
at least an integral sortion of the receiving coupler of a first color,
the plug member of the first type comprising a barrel receivable within a bore of the receiving coupler of the first type,
the plug member comprising an outer surface of the first color,
whereby a user may match the plug member to the receiving coupler based on visual examination of the colors thereof,
the receiving coupler comprises an anodized sleeve,
a first portion of the sleeve of the receiving coupler anodized in the first color,
a second portion of the sleeve is anodized in a second color,
a first portion of the plug is anodized in the first color,
a second portion of the plug is anodized in the second color.

4. An air line coupler assembly comprising
a receiving coupler element,
a plug slidably receivable within a bore of the coupler element,
the coupler element comprising an outer sleeve,
the sleeve selectively slidable along a body of the coupler element,
the outer sleeve constructed of anodized aluminum,
the plug constructed of anodized aluminum,
the sleeve and the plug of substantially identical color.

5. The air line coupler assembly of claim 4 whereby
the sleeve is anodized in a selected color of the group comprising red, green, blue, black, and gold,
the plug anodized in the selected color.

6. An air line coupler assembly comprising
a receiving coupler element,
the receiving coupler including a bore therein,
an elongate plug receivable within the bore of the coupler element,
the plug including an axial passageway therethrough,
the axial passageway of the plug communicative with the bore of the receiving coupler when the plug is matingly received within the bore of the coupler element,
the coupler element comprising an outer sleeve,
an irremovable exterior portion of the sleeve marked with a first color,
the exterior portion of the sleeve integral with the sleeve,
an exterior of the plug marked with the first color,
the exterior portion of the plug integral with the plug,
the plug is constructed of aluminum,
the exterior of the plug is anodized in the first color,
the sleeve of the receiving coupler is anodized in the first color.

7. An air line coupler assembly comprising
an air line plug of a first type,
the plug comprising an elongated barrel,
an air line coupler of the first type,
the air line coupler comprising a bore therethrough,
the air line coupler further comprising a sleeve selectively slidable against a biasing element,
the air line coupler slidably receiving the barrel of the plug in the bore thereof when the sleeve is displaced from a rest position,
the air line coupler capturing the barrel of the plug when the sleeve is in its rest position,
the air line plug of the first type matable with the air line coupler of the first type to create an airtight coupling,
the air line plug of the first type matingly incompatible with an air line coupler of a type other than the first type,
the air line plug of the first type permanently marked with a first color on an exterior thereof,
the air line coupler of the first type displaying the first color on an exterior metal sleeve thereof,
each air line coupler of a type other than the first type bearing a color other than the first color.

8. A system to facilitate selection of compatible pneumatic connection components from a collection of receiving couplers and plug members, the receiving couplers and the plug members of more than one type, the invention comprising,
at least one receiving coupler of a first type,
the at least one receiving coupler of the first type comprising a metal sleeve selectively slidable against a biasing element,
at least one plug member of the first type,
the at least one plug member of the first type comprising a barrel slidably receivable within a bore of the at least one receiving coupler of the first type,
each plug member of the first type properly matable with each receiving coupler of the first type to establish an airtight coupling therebetween,
each plug member of the first type not properly matable with a receiving coupler of a type other than the first type wherein a coupling of each plug member of the first type to a receiving coupler of a type other than the first type creates a leaking coupling,
the at least one plug member of the first type comprising an outer surface, the outer surface of the at least one plug member bearing a first color permanently affixed thereto, the at least one receiving coupler of the first type bearing the first color on the metal sleeve thereof, each receiving coupler of a type other than the first type bearing a color other than the first color on an observable part thereof.

9. A system for selecting properly matching components for an air line coupling comprising a plurality of receiving couplers each comprising an elongate bore therethrough, a plurality of plugs each receivable within the bore of any one of the receiving couplers, the plurality of receiving couplers comprising receiving couplers of a first type and receiving couplers of other than the first type, the plurality of plugs comprising plugs of the first type and plugs of other than the first type, any one of the plugs of the other than the first type not properly matable with a receiving coupler of the first type, each of the plugs of the first type matable with any one of the receiving couplers of the first type to create an airtight coupling, each of the plugs of the first type including an irremovable marking in a first color, each of the receiving couplers of the first type including an irremovable marking in the first color on a metal sleeve thereof, the metal sleeve selectively slidable against a biasing element, each of the plugs of the other than the first type including an irremovable marking in a color other than the first color, each of the receiving couplers of the other than the first type including an irremovable marking on a metal sleeve thereof in a color other than the first color, whereby a user may match a properly mating plug with a receiving coupler by matching the color marking on the plug with the color marking on the receiving coupler.

10. In a collection of air line coupling components including a plurality of receiving couplers of at least first and second types and further including a plurality of air line plugs of at least first and second types, wherein interconnection of the air line plugs of a first type with any one of the air line couplers of the first type will establish a leak free coupling and further wherein the air line plugs of a type other than the first type are incompatible with the air line couplers of the first type, the improvement comprising each of the air line plugs of the first type bearing an observable first color, the first color being irremovable from each of the air line plugs of the first type, each of the air line couplers of the first type bearing the first color on a metal sleeve thereof, the metal sleeve selectively slidable against a biasing element, the first color being irremovable from the metal sleeve of each of the air line couplers of the first type, the air line plugs of a type other than the first type bearing a color other than the first color, each of the air line couplers of other than the first type bearing a color other than the first color on an exterior thereof, whereby a user may match a plug member of the first type with a receiving coupler of the first type by observing matching colors thereon.

\* \* \* \* \*

UNITED STATES PATENT AND TRADEMARK OFFICE
CERTIFICATE OF CORRECTION

PATENT NO.        : 7,980,599 B2
APPLICATION NO.   : 11/525652
DATED             : July 19, 2011
INVENTOR(S)       : Richard T. Schindel It is certified that error appears in the above-identified patent and that said Letters Patent is hereby corrected as shown below:

In Claim 3, Column 5, Line 40, the word "sortion" should read "portion".

Signed and Sealed this
Tenth Day of April, 2012

David J. Kappos
*Director of the United States Patent and Trademark Office*